Aug. 30, 1938.                    W. L. HAGER                    2,128,245
                    COMBINED AIR CONDITIONER AND FURNACE
                        Filed May 11, 1934          2 Sheets-Sheet 2
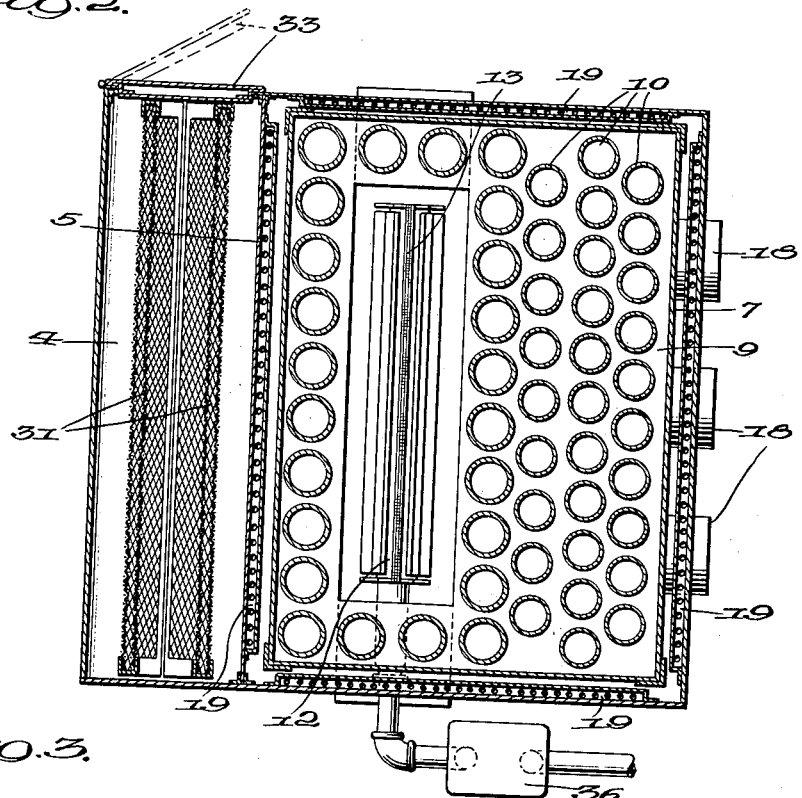
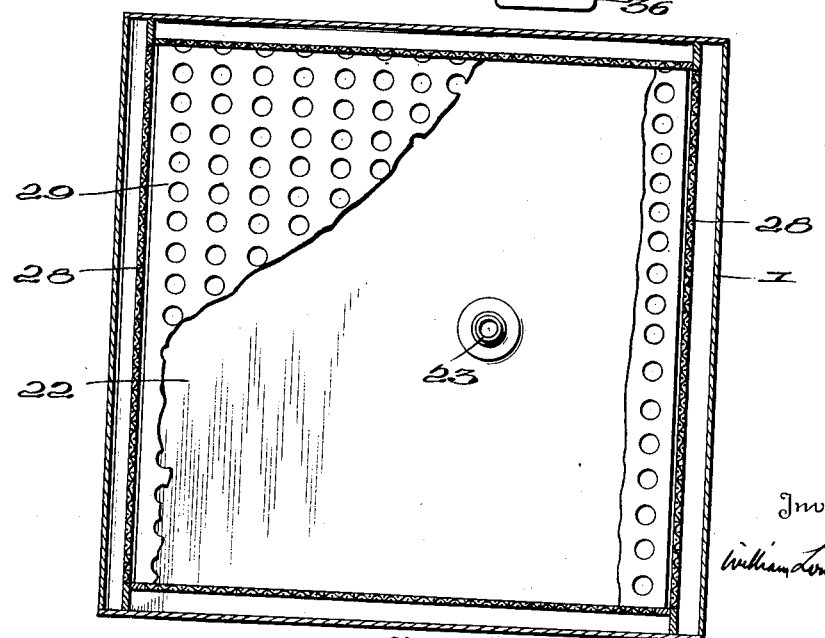
Inventor
William Louis Hager
By E. C. Brandenburg
               Attorney Patented Aug. 30, 1938

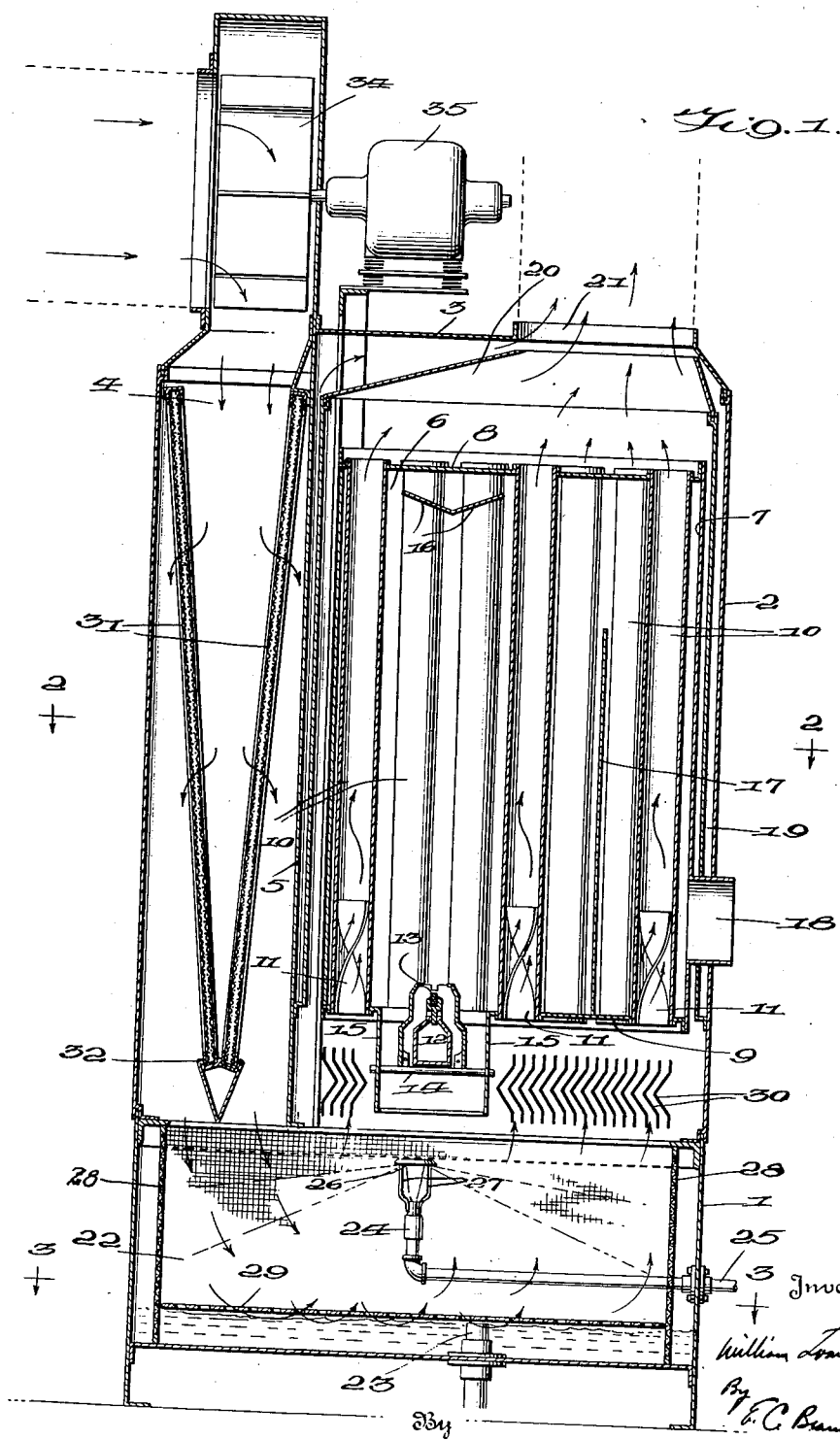

2,128,245

UNITED STATES PATENT OFFICE 2,128,245

COMBINED AIR CONDITIONER AND FURNACE

William Louis Hager, Ogden, Utah

Application May 11, 1934, Serial No. 725,213

4 Claims. (Cl. 261—104)

This invention relates to an improvement in combined air-conditioners and furnaces, capable of use either as an air-conditioner during warm weather or as a furnace during cold weather, and in either event providing the proper humidity in the air.

The object of the invention is to provide a compact device which will act as an air-conditioner to cool the air during the summer, while in the winter the same device affords a highly efficient furnace of the heated air type by merely cutting down the water spray and starting a heater located in the furnace, thereby supplying cooled or heated air as desired.

This combined air-conditioner and furnace is of such simple and compact form that it may be manufactured for sale at a cost approximating the cost of an ordinary furnace.

The invention utilizes novel and improved means for humidifying and heating the air circulated therethrough, and a V-shaped filter is employed providing the maximum filtering surface in a comparatively narrow passage. The action of the humidifier supplies the desired amount of moisture to the air either when the air is heated or cooled, and when a substantial spray is produced, screens around the sides effectively eliminate noise such as would be caused by the spraying of water against the metallic sides of the casing.

In the accompanying drawings:

Fig. 1 is a vertical sectional view through the complete device;

Fig. 2 is a horizontal sectional view therethrough on the line 2—2 of Fig. 1; and Fig. 3 is a similar view on the line 3—3 of Fig. 1.

The complete device is shown as constructed generally of approximately the shape and size of an ordinary furnace, and the walls thereof are preferably constructed of rigid sheet-metal or the like, although that is not essential as any material suitable for the purpose may be employed. A base portion 1 serves to support a body portion 2 mounted thereupon, and which body portion has a top 3.

The body portion 2 is provided with an air intake passageway 4 located at one side thereof and separated by a partition 5 from a heating-chamber 6. Said heating-chamber has a surrounding wall 7 supported by suitable brackets within the body portion 2, and within the wall 7 are top and bottom headers 8 and 9 respectively, which support upright tubes 10. The tubes immediately surrounding the burner are preferably of cast-iron which better stands the terrific heat generated in the burner, while the tubes slightly spaced therefrom are preferably made of steel which affords more conductivity. The lower end portions of the tubes 10 have spiral vanes 11 therein which extend through only a comparatively slight distance up in the tubes sufficient to impart a slight whirl to the air passing therethrough in order to heat the air effectively. It is desired that the spirals 11 should not extend throughout the length of the tubes, which would hinder the operation of the device by substantially reducing the amount of air passing through the tubes. The spirals extend only far enough to cause the currents of air to assume a circular motion without retarding the supply of air through the tubes.

The air passing through the tubes is heated by a suitable burner designated generally by the numeral 12, and which may be similar to the burner illustrated and described in my prior application on Gas burners, Serial No. 597,071, filed March 5, 1932, now Patent No. 1,957,587 granted May 8, 1934. However, I have provided a channel along the upper edge of the burner, within which I have placed a screen 13, which in cross-section is of an inverted U-shape.

The lower edges of this screen are seated in the channel, as designated at 13, and the screen is disposed at the point where the gas and air are mixed, facilitating the mixing thereof, and by reason of the passage of the gas and air through this screen, it effects a silencing of the burner which is very desirable in a furnace. The burner is shown as supported on cross-bars 14 carried by suitable supports 15, which extend downwardly from the bottom header 9.

Arranged over the burner 12 inside the heating-chamber 6 are deflectors 16 for directing the heat and products of combustion around the tubes 10 for effectively heating the air passing upwardly through the tubes. An upright baffle 17 is carried by the bottom header 9 and extends to a point near the top of the heating chamber 6 so as to cause an upward circulation of the heat and products of combustion, after which the products of combustion may be discharged from the heating-chamber through the outlets 18, of which one or more may be used as desired.

Surrounding the wall 7 within the casing 2 are insulating spaces 19, through which air is forced upwardly between the wall 7 and the casing 2 and partition 5, by the fan, which thereby increases the insulating properties of the space, the air being discharged into the space at the top of the casing, passing over a shield 20. The shield 20 converges to a point just beneath an outlet 21 in the top 3 of the casing, and it serves to direct the air from the tubes 10 to said outlet.

If desired, the discharge may be arranged similarly to that disclosed in my prior application on Circulating heaters, Serial No. 597,070, filed March 5, 1932, now Patent No. 1,987,145 dated Jan. 8, 1935 in which event the upper ends of the tubes 10 would be in the staggered relation shown in said application.

The base portion 1 of the casing encloses a humidifying chamber 22 adapted to contain a suitable amount of water, the volume of which is regulated by an overflow pipe and drain 23. The water is supplied by a water-nozzle 24 connected with a supply-pipe 25 having provision for regulating the supply of water forced therethrough. The upper end of the nozzle 24 has an opening for directing a jet of water upwardly against a solid disk 26, carried by brackets 27 which extend upwardly from the nozzle 24. The jet of water directed against the under side of the disk 26 under substantial pressure gives a fine spray or mist to be directed laterally around the nozzle from the edges of the disk in order to humidify the air effectively as it passes therethrough.

While one nozzle is shown in the drawings, and would be sufficient for a device of small size, if desired more than one nozzle may be used, particularly where the size and capacity of the device is increased. The mist being directed laterally toward the sides of the base 1 would normally cause considerable noise by striking the metallic side walls. To prevent this noise, screens 28 are placed around the humidifying-chamber 22 spaced inwardly from the walls.

A perforated floating pad 29 of absorbent material, such as felt and cork combined, floats on the surface of the water for the purpose of collecting the water from the spray or mist, and by retaining the moisture supplied it to the air circulated in contact with this pad. This pad 29 also eliminates the noise that would otherwise result from the drip and the splashing of the water in the base portion.

Arranged over the humidifying chamber 22 and beneath the lower ends of the tubes 10 are condenser-plates 30 which are shown as of zigzag shape in cross-section for the purpose of condensing or at least reducing the volume of water from the air. These plates may be of suitable material, and either flat or of a desired shape such as to remove the water not needed for humidifying the air, from the air, so that the air will not be overladen with moisture. The intake passageway 4 has a pair of air-filter screens 31 arranged therein in V-shape for the purpose of filtering the air passing through the passageway. By arranging the screens in the relation shown, a maximum filtering surface is provided, while at the same time eliminating as far as possible clogging of the filters as might occur if they were arranged approximately transversely of the passageway. The screens 31 are supported on a V-shaped support 32 mounted in the casing. As shown in Fig. 2, a door 33 closes one side of the passageway 4, but which may be opened to permit removal of the screens 31 and support 32 for inserting a cake of ice into the bottom or base of the device, either directly on the bottom or on the floating pad 29 in order to cool the air effectively as it passes therethrough when the device is used as an air-conditioner. Air is supplied to the passageway 4 by means of a fan 34 driven by a suitable motor 35.

When using the device as an air-conditioner, the fan is operated to draw air in and force it through the passageway 4 and filters 31, where it is circulated through the mist produced by nozzle 24 and is effectively humidified and cooled thereby, any excess of moisture being removed by the condenser-plates 30, after which the cooled air is directed up through the tubes 10 and the outlet 21 into the room or building as desired. However, when the device is used as a furnace, the amount of water entering through the nozzle 24 is reduced to an amount merely sufficient to maintain a humid condition in the humidifying-chamber 22, as described above, and the gas-burner 12 is operated to effectively heat the air passing through the tubes 10, the heated air passing out through the discharge outlet 21, while the products of combustion are drawn off through the outlets 18 after circulating around the tubes 10 and over baffle 17.

The burner 12 may be controlled by a thermostatically operated valve designated 36 in Fig. 2, which may also control the motor 35 for the fan 34. This enables the device to be used either as an air-conditioner in summer, or as a furnace during the winter, the change merely involving a reduction of the mist discharged from the nozzle 24 and the lighting of the burner 12.

I claim:

1. In an air-conditioner having a humidifying-chamber adapted to contain a body of water therein, means for spraying water in said chamber, and a flat floating-pad on the surface of the body of water beneath said spraying means and having perforations distributed substantially over the entire surface thereof.

2. In an air conditioner, the combination of a base enclosing a humidifying chamber, a casing superimposed on said base and having a transverse partition therein dividing the casing into intake and discharge chambers communicating at their lower ends with the humidifying chamber, an air filtering screen extending transversely of the intake chamber for removing foreign substances from the air before said air reaches the humidifying chamber, means for heating the air during passage through the discharge chamber, a spray located in the humidifying chamber arranged to discharge through the air passing through said chamber, means for maintaining a body of water in the bottom of said humidifying chamber, a perforated pad floating on the surface of said body of water, and screens surrounding the spray in slightly spaced relation from the walls of the humidifying chamber and extending approximately throughout the height of said chamber.

3. In an air conditioner, a humidifying chamber, a spray arranged in said chamber in position to discharge through the air passing therethrough, means for maintaining a body of water in the bottom of said chamber, a foraminous sheet floating on the surface of said body of water, and screens surrounding the spray in slightly spaced relation from the walls of the chamber and extending approximately throughout the height of said chamber.

4. In an air conditioner, the combination of a base enclosing a humidifying chamber, a separate box-like casing superposed upon and supported by the base and having a top portion provided with inlet and outlet therein, a transverse partition in the casing extending downwardly from the top approximately to the humidifying chamber dividing said casing into intake and discharge passageways communicating at their lower ends through the humidifying chamber, said humidifying chamber extending approximately throughout the base, air filtering means in said intake passageway, and means in the upper portion of said humidifying chamber for directing a moisture spray transversely of the passage of air therethrough, blower means in said intake passageway and having a driving motor out of contact with the air passing therethrough, moisture condensing means in the discharge passageway, and air conditioning means in said discharge passageway.

WILLIAM LOUIS HAGER.